(12) United States Patent
Su

(10) Patent No.: US 10,114,485 B2
(45) Date of Patent: Oct. 30, 2018

(54) KEYBOARD AND TOUCHPAD AREAS

(71) Applicant: HEWLETT-PACKARD DEVELOPMENT COMPANY, L.P., Houston, TX (US)

(72) Inventor: Gen-Hung Su, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/911,276

(22) PCT Filed: Sep. 30, 2013

(86) PCT No.: PCT/US2013/062707
§ 371 (c)(1),
(2) Date: Feb. 10, 2016

(87) PCT Pub. No.: WO2015/047412
PCT Pub. Date: Apr. 2, 2015

(65) Prior Publication Data
US 2016/0202778 A1    Jul. 14, 2016

(51) Int. Cl.
| | |
|---|---|
| *G06F 3/02* | (2006.01) |
| *G06F 3/0354* | (2013.01) |
| *G06F 1/16* | (2006.01) |
| *G06F 3/041* | (2006.01) |
| *G06F 3/0481* | (2013.01) |
| *G06F 3/0482* | (2013.01) |
| *G06F 3/0484* | (2013.01) |
| *G06F 3/0488* | (2013.01) |
| *G06F 3/023* | (2006.01) |

(52) U.S. Cl.
CPC ........... *G06F 3/03547* (2013.01); *G06F 1/16* (2013.01); *G06F 1/1662* (2013.01); *G06F 1/1692* (2013.01); *G06F 3/0227* (2013.01); *G06F 3/0238* (2013.01); *G06F 3/0416* (2013.01); *G06F 3/0482* (2013.01); *G06F 3/04817* (2013.01); *G06F 3/04845* (2013.01); *G06F 3/04883* (2013.01); *G06F 3/04886* (2013.01)

(58) Field of Classification Search
CPC ...... G06F 1/1662; G06F 3/02; G06F 3/03547; G06F 1/1692; G06F 3/0227; G06F 3/0416; G06F 3/04817; G06F 3/0482; G06F 3/04845; G06F 3/04883; G06F 1/16; G06F 3/0238; G06F 3/04886
USPC ........................................................ 345/168
See application file for complete search history.

(56) References Cited

U.S. PATENT DOCUMENTS 6,043,809 A * 3/2000 Holehan ................. G06F 3/021
345/168
6,887,005 B2    5/2005 Kim
(Continued)

FOREIGN PATENT DOCUMENTS

| CN | 102117102 | 7/2011 |
|---|---|---|
| CN | 201897760 | 7/2011 |

(Continued)

OTHER PUBLICATIONS

Holmes, C., "Asus NX90Jq review", Pocket-lint Ltd; Apr. 11, 2011.

*Primary Examiner* — Adam J Snyder
(74) *Attorney, Agent, or Firm* — HPI Patnet Development

(57) ABSTRACT

First and second touchpad areas are located at first and second sides of a keyboard.

17 Claims, 10 Drawing Sheets

(56) References Cited

U.S. PATENT DOCUMENTS

| | | | |
|---|---|---|---|
| 7,088,343 B2 * | 8/2006 | Smith | G06F 1/1616 345/168 |
| 2002/0158838 A1 | 10/2002 | Smith et al. | |
| 2007/0013662 A1 * | 1/2007 | Fauth | G06F 3/016 345/168 |
| 2009/0146960 A1 | 6/2009 | Gim | |
| 2009/0201254 A1 * | 8/2009 | Rais | G06F 1/1613 345/168 |
| 2009/0322683 A1 * | 12/2009 | Tsuji | G06F 3/03547 345/173 |
| 2011/0164359 A1 * | 7/2011 | Chu | G06F 1/169 361/679.01 |
| 2011/0187649 A1 * | 8/2011 | Chu | G06F 3/02 345/168 |
| 2011/0193813 A1 | 8/2011 | Gralewski et al. | |
| 2011/0199307 A1 | 8/2011 | Dinh et al. | |
| 2011/0211299 A1 | 9/2011 | Kusaka | |
| 2011/0215914 A1 * | 9/2011 | Edwards | G06F 3/041 345/173 |
| 2011/0216007 A1 * | 9/2011 | Cheng | G06F 3/0488 345/168 |
| 2011/0267371 A1 * | 11/2011 | Song | G06F 3/0481 345/660 |
| 2012/0106060 A1 | 5/2012 | Probst et al. | |
| 2012/0113009 A1 | 5/2012 | Hotelling et al. | |
| 2012/0169621 A1 * | 7/2012 | Grossman | G06F 3/04886 345/173 |
| 2013/0016046 A1 * | 1/2013 | Chou | G06F 3/0416 345/173 |
| 2013/0044060 A1 * | 2/2013 | Lee | G06F 3/04886 345/168 |
| 2013/0050092 A1 * | 2/2013 | Ivanov | G06F 3/017 345/168 |
| 2014/0285439 A1 * | 9/2014 | Oishi | G06F 3/04886 345/168 |

FOREIGN PATENT DOCUMENTS

| | | |
|---|---|---|
| CN | 102880332 | 1/2013 |
| CN | 102955572 | 3/2013 |
| TW | 200511095 A | 3/2005 |
| TW | 200622828 A | 7/2006 |
| TW | 201003472 A | 1/2010 |
| TW | 201025085 A | 7/2010 |
| TW | 201201050 A | 1/2012 |
| TW | 201203016 A | 1/2012 |
| WO | 2010024826 | 3/2010 |
| WO | WO-2012122007 | 9/2012 |

* cited by examiner

KEYBOARD AND TOUCHPAD AREAS

BACKGROUND

Many computer devices take input from a keyboard. For example, a laptop computer has a display pivotably attached to a base comprising a keyboard. In addition to a keyboard, a computer device may also be attached to a mouse, or have a trackball or a touchpad for receiving further input. A touchpad detects touch by a user and converts this to an input signal. For example, a user may able to control a pointer shown on the display by moving their finger across a surface of the touchpad. Touch sensitive displays are also used by some computer devices, whereby a user is able to input instructions directly to the computer by touching the display.

BRIEF DESCRIPTION OF THE DRAWINGS

Examples will now be described, by way of non-limiting example only, with reference to the accompanying drawings, in which.

DETAILED DESCRIPTION

Figure 1:
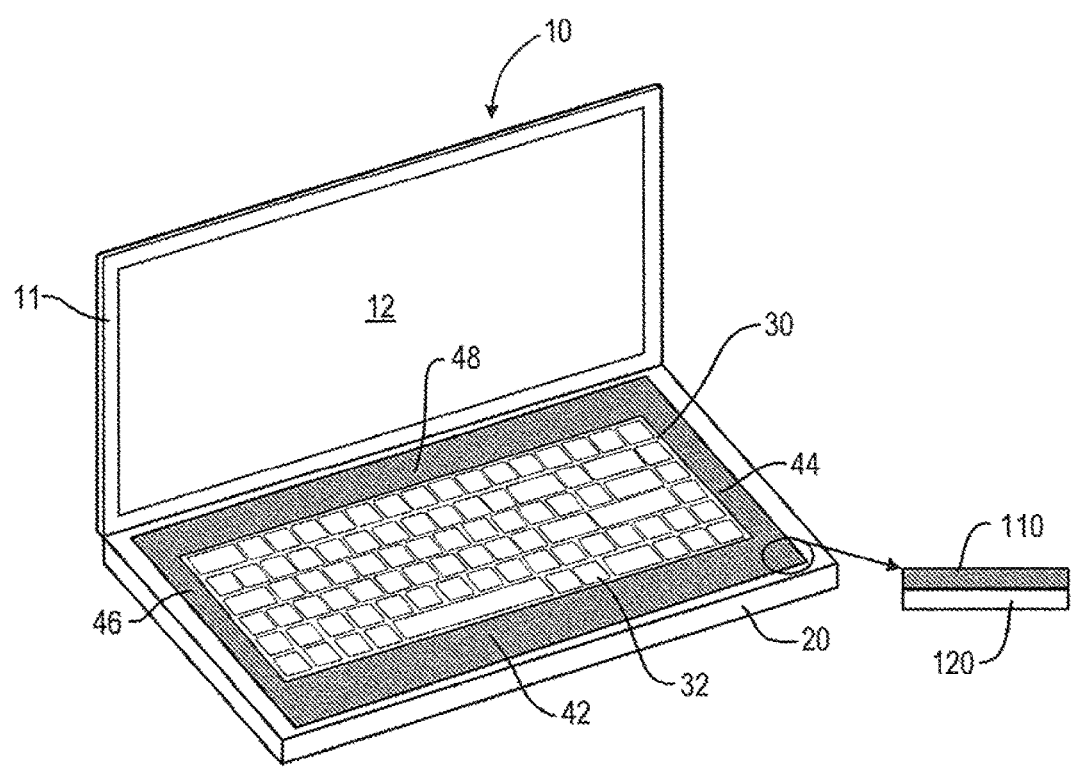
FIG. 1 is a perspective view of an example of a computer device.

FIG. 1 shows a perspective view of an example computer device. The computer device includes a display 10 and a base 20. The base 20 includes a keyboard 30 comprising a plurality of keys 32. The base further includes a first touchpad area 42 at a first side of the keyboard, a second touchpad area 44 at a second side of the keyboard, a third touchpad area 46 at a third side of the keyboard and a fourth touchpad area 48 at a fourth side of the keyboard.

As there are a plurality of touchpad areas located at different sides of the keyboard, the user has more input options compared to the case if there was only one touchpad area located at one side of the keyboard.

Further, it may be more convenient for the user to input to one of the touchpad areas than to a touch sensitive display, as the touchpad areas are closer the user's hands in the typing position. This can be appreciated from FIG. 2, which is a schematic view of the arrangement of FIG. 1. It is easy for the user to switch from a typing with their fingers over the keyboard as shown by 101L, 101R to a finger over a touchpad area as shown for example by 102L, 102R. Indeed their fingers (including thumbs) may move to any of touchpad areas 42, 44, 46 or 48.

Figure 2:
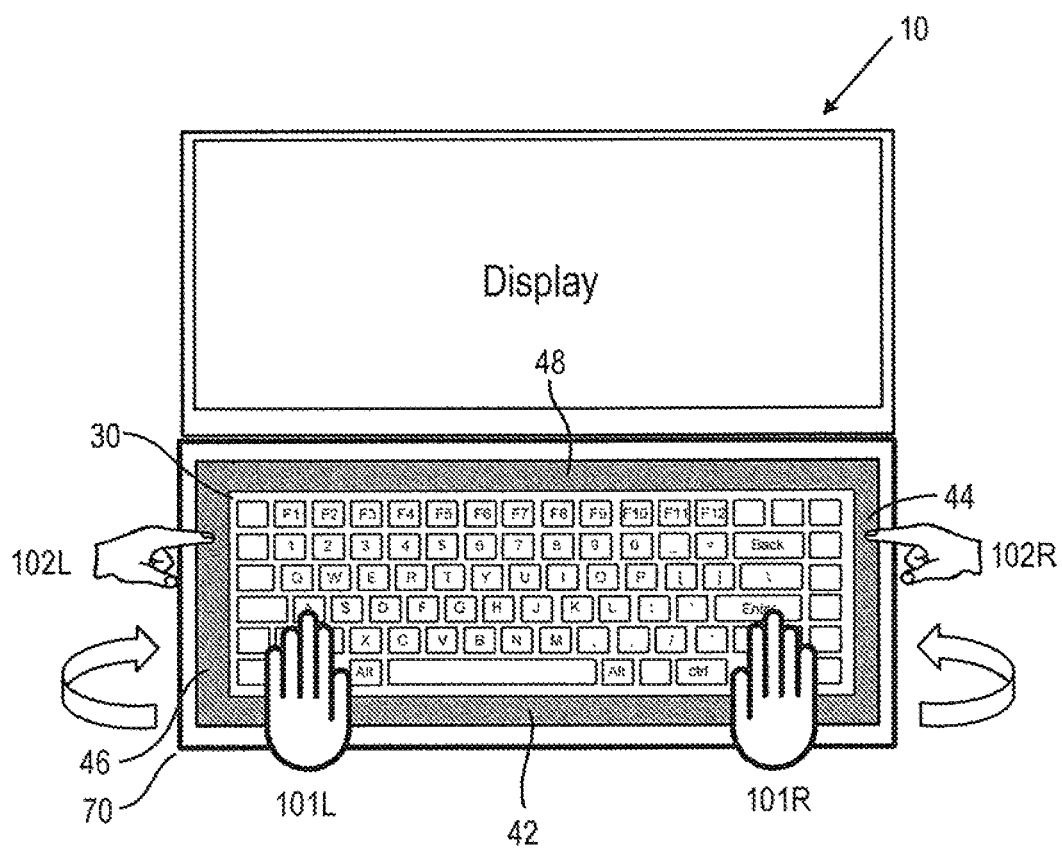
FIG. 2 is a schematic view of the computer device of FIG. 1.
Figure 3:
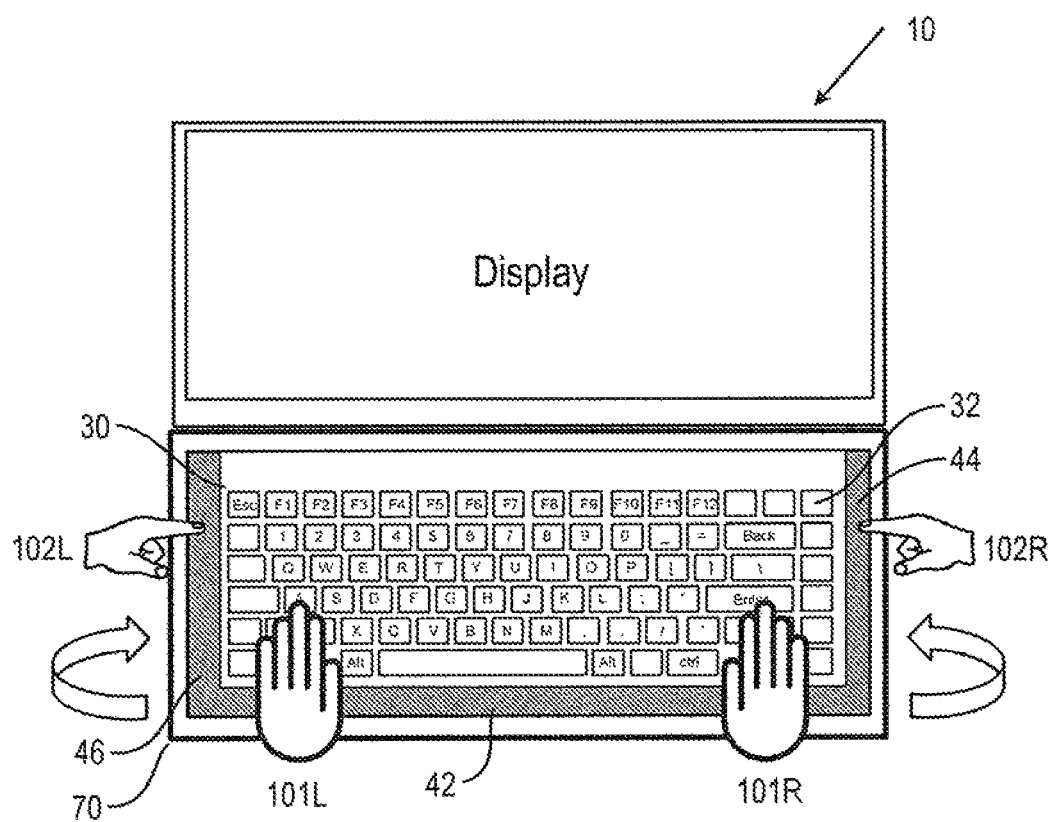
FIG. 3 is a schematic view of another example computer device.
Figure 4:
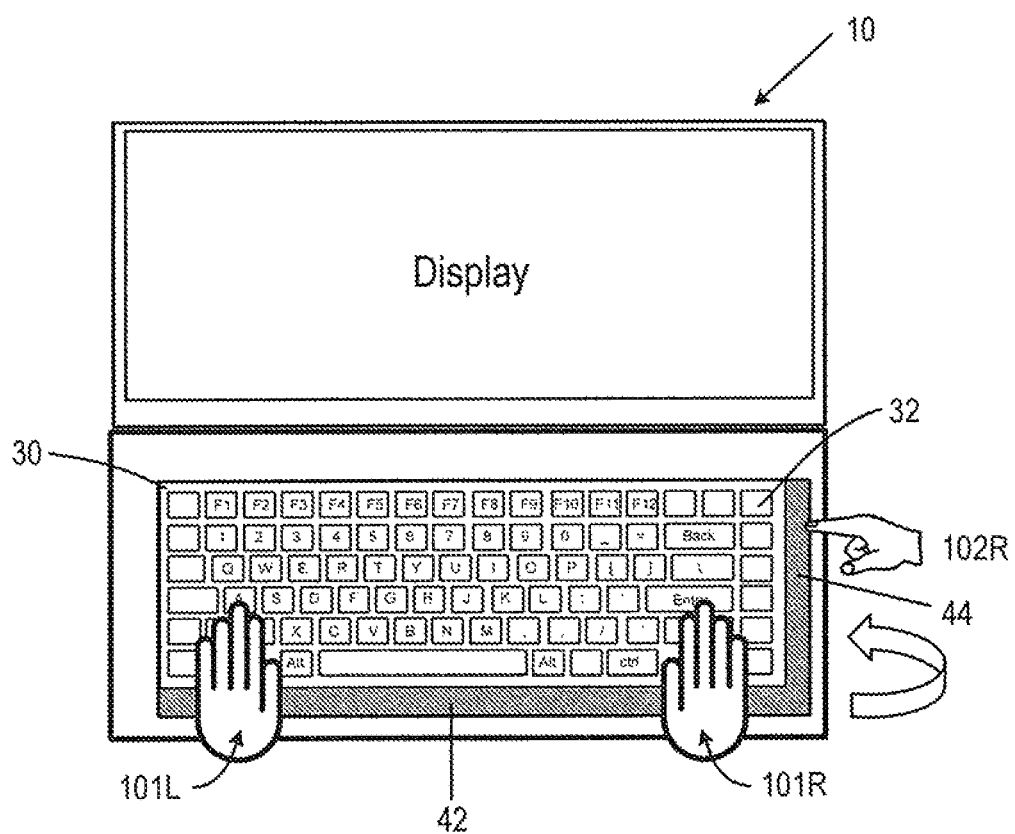
FIG. 4 is a schematic view of another example computer device.

While FIGS. 1 and 2 show an example in which there are four touchpad areas, one on each side of the keyboard, in other examples there may be fewer touchpad areas. In the example of FIG. 3 there are three touchpad areas: on first, second and third sides of the keyboard. In the example of FIG. 4 there are two touchpad areas: on the first and second sides of the keyboard.

Note that in the context of this disclosure "first side", "second side" and "third side" and "fourth side" refer to arbitrary sides of the keyboard and should not be interpreted as referring to a particular position. For example, in the example of FIG. 3 the "first side" corresponds to the bottom side of the keyboard, the "second side" corresponds to the right side of the keyboard and the "third side" corresponds to the left side of the keyboard. However, in another example the "first side" may correspond to the top of the keyboard, the "second side" to the right side of the keyboard and the "third side" to the left side of the keyboard, so there may be touchpad areas at the left, right and top sides of the keyboard with no touchpad area located at the bottom of the keyboard. In another example the "first side" may correspond to the bottom side of the keyboard, the "second side" to top side of the keyboard and the "third side" to the right of the keyboard; so in this example there is no touchpad area to the left of the keyboard.

FIG. 4 is a schematic example of a keyboard in which there are two touchpad areas. In FIG. 4, the "first side" corresponds to the bottom side of the keyboard and "second side" corresponds to the right side of the keyboard. This layout may be particularly intuitive and or convenient for right handed users. However, in other examples the two touchpad areas could be to the bottom and the left of the keyboard instead, or at the top and bottom etc.

In the context of this disclosure the term "located to a side of the keyboard" includes both the case where the touchpad area is located immediately next to that side of the keyboard and the case where the touchpad area is located to that side of the keyboard, but there is a gap between the keyboard and the touchpad area.

Figures 5, 6:
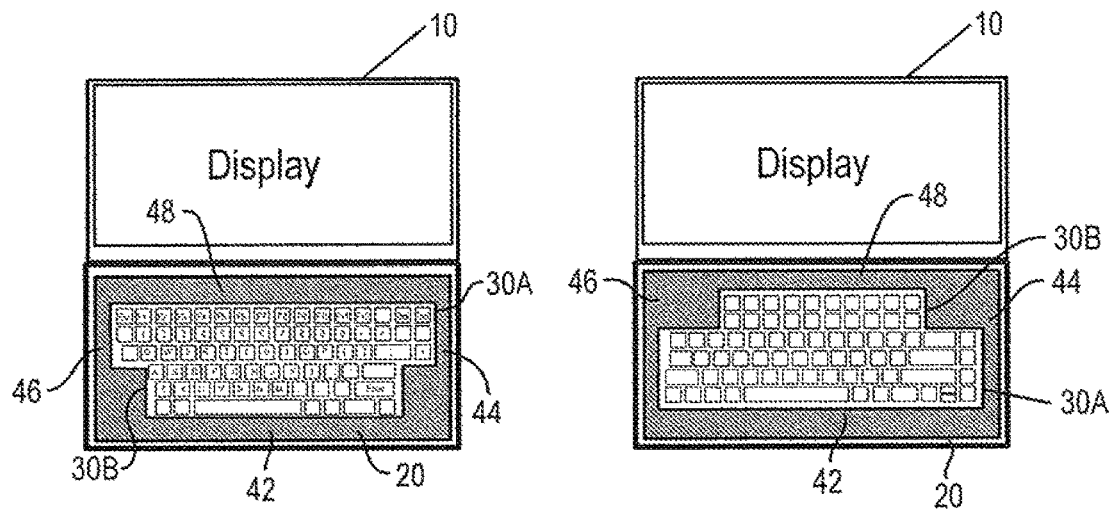
FIG. 5 is a schematic view of an example computer device having a T-shaped keyboard.
FIG. 6 is a schematic view of an example computer device having an inverted T-shaped keyboard.

FIGS. 1 to 4 show a keyboard having an approximately rectangular shape. However, other shapes are possible. For example it is possible to have a keyboard with a first portion 30A having a first width and a second portion 30B having a second width less than the first width. In that case one of the touchpad areas may extend into the area adjacent both the first and second portions of the keyboard. For example FIG. 5 shows a T-shaped keyboard. The first portion being the horizontal line of the "T" has a greater width than the second portion which corresponds to the vertical line of the "T". In one example this shape is achieved by removing function keys while keeping a substantially conventional QWERTY layout for the rest of the keys.

Figure 7:
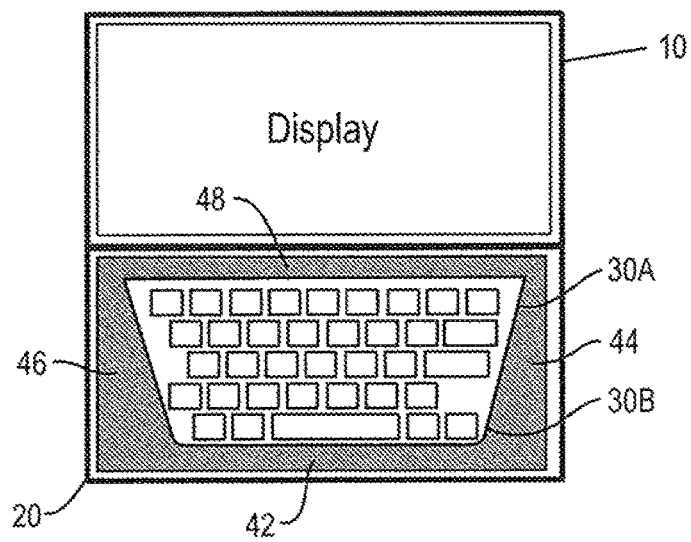
FIG. 7 is a schematic view of an example computer device having a tapered shaped keyboard.

The second and third touchpad areas extend into the space adjacent the first and second portions, i.e. below the horizontal line of the inverted "T". In this way the size of the touchpad area is increased compared to the configuration shown in FIG. 2. This increases the range of movement and gestures possible with respect to the touchpad area. FIG. 6 is a schematic diagram similar to FIG. 5, but in this case the keyboard has an "inverted T" shape. Again the horizontal line of the "inverted T" corresponds to the first portion 30A having the larger width and the vertical line corresponds to the second portion 30B having the smaller width. Shapes other than exact T-shapes are possible while still allowing one or more touchpad areas to be enlarged to extend into a space adjacent the first and second portions. For example, FIG. 7 shows a schematic diagram in which the keyboard has a tapered shape. The second and third touchpad area fit along the tapered sides and are thus adjacent both the nominal first and second keyboard portions shown in FIG. 7.

In the above examples the various touchpad areas may be different areas of the same touchpad device or may be separate touchpad devices. For example, FIG. 2 shows a single touchpad device which forms a continuous ring that surrounds the keyboard area. In this case the first, second, third and fourth touchpad areas join seamlessly together. Likewise, the first, second and third touchpad areas 42, 44 and 46 in FIG. 3 may be implemented by a single U shaped touchpad device.

Figure 8A:
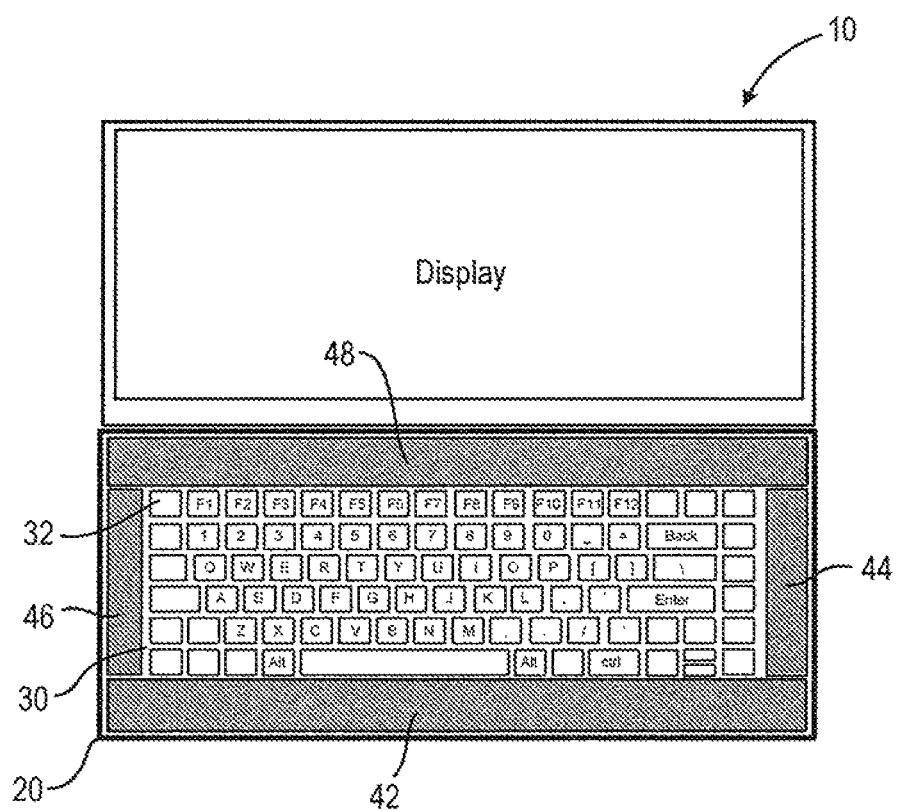
FIG. 8A is a schematic view of another example computer device.

In other examples the various touchpad areas may be provided by separate touchpad devices. For example, FIG. 8A is a schematic diagram which is similar to FIG. 2, but which clearly shows the first, second, third and fourth touchpad areas as separate touchpad devices. By "separate touchpad devices" it is meant that each touchpad area is a separate module which may be installed separately during the manufacturing process and/or may have its own separate touchpad circuitry. Likewise, examples with two or three touchpad areas on different sides of the keyboard, such as FIG. 3 or 4 could be implemented with separate touchpad devices positioned directly adjacent each other, with no appreciable gap between them, to join seamlessly together.

Figure 8B:
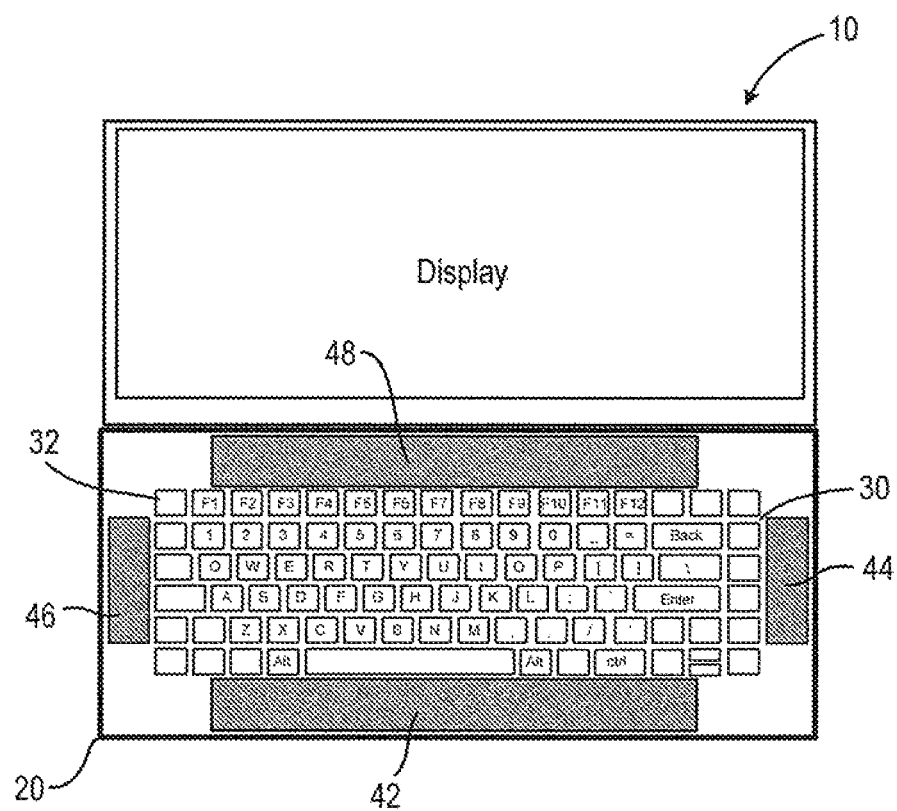
FIG. 8B is a schematic view of another example computer device.

In still other examples, the various touchpad areas may be provided by separate touchpad devices which are spaced apart from each other with gaps between them. FIG. 8B is a schematic diagram of an example, similar to FIG. 8A, but in which the touchpad devices are spaced apart from each other. Likewise, the examples of FIGS. 2 and 3 could be modified by implementing the touchpad areas as separate touchpad devices which are spaced apart with gaps between them.

In some examples, the separate touchpad areas may be switched on and off independently of each other. For example, double tapping a predetermined section of the touchpad area may turn that touchpad area on or off or they could be turned on and off through a software setting or by a user interface on the display. When the touchpad area is off it does not send input signals to the computer device. Thus a user may switch off a particular touchpad area if he or she does not want to use that area and wishes to avoid sending input to the computer by accidentally touching that area.

The display 10 of the computer device may comprise a display housing 11 and a display screen 12 inside the housing. The base 20 of the computer device may comprise a base housing and the keyboard 30 and touchpad areas may be installed in the base housing. The display 10 may be pivotably attached to the base 20, for example by one or more hinges, or by another mechanical connection which allows pivoting. Signals from a processor in the base of the computing device may be passed to the display through a wire or cable between the display and the base or through a hinge or other mechanical connection between the display and base. In other examples, the display 10 may be removably attached to the base, for example the base may have quick release mechanical connectors which can slot into receiving slots in the base.

The display may be a touch sensitive display or a normal (non-touch sensitive) display. If the display is not touch sensitive, then the fact that there are a plurality of touchpad areas at different sides of the keyboard may enable the user to input touch gestures over a range of areas which may to some extent make up for the lack of a touch sensitive display. For example, if the computer device has an operating system designed for use with a touch sensitive display, the user may still be able to input touch gestures in an intuitive manner by using the plurality of touchpad areas at different sides of the keyboard. Providing a plurality of touchpad areas may be cheaper than providing a touch sensitive display. Even if the display is touch sensitive, it may sometimes still be more convenient for the user to input to one of the touchpad areas than to the display, as the touchpad areas are nearer the users hands in the typing position.

In the example of FIG. 2, the first touchpad area 42 extends across the entire length of the first side of the keyboard. This means that a touch on the touchpad area may be mapped directly to a corresponding area of the display. This may make touch input more intuitive for the user, especially if the operating system is designed for use with a touch sensitive display. In other examples a touch on the touchpad area may be mapped to the display, but not mapped directly so that a relatively small movement on the touchpad area may cause a relatively large movement of a pointer on the display. As shown in FIG. 2, other touchpad areas may also extend across the entire length of their respective sides of the keyboard.

The keyboard itself may comprise a plurality of depressible keys. For example each key may be coupled to a respective switch on a circuit board under the keys, so that each key press may be converted to a signal corresponding to the pressed key (the signal is output from the keyboard and input to the computer device).

In another example the keyboard itself may not have depressible keys, but rather be implemented by capacitive sensors or other touch detecting technology, in either case the keyboard area comprises a plurality of keys and is to sense presses to particular keys and to generate an input signal to the computing device based on the pressed key, while the touchpad areas are configured to sense movement of a touch contact moving across a surface of the touchpad area and to convert the sensed movement into a corresponding input signal.

In general terms the touchpad areas are to detect gestures made by the user and convert these gestures to input signals for the computer device. A gesture may for example be a movement of a touch contact moving across a surface of the touchpad area. A touch contact is for example a finger, thumb, or stylus etc of a user in contact with the touchpad area. The movement may be mapped to the display, for example a pointer on the display may be moved based on the detected movement of the touch contact, or a touch to the touchpad may be interpreted as a touch to a corresponding area of the display. In another example a gesture may be a tap or double tap of a user's finger or other touch contact to the touchpad area which may be interpreted as an icon selection or a mouse click or double click. In another example a gesture may be a particular movement or combination of movements given a predetermined meaning such as a pinch zoom in/zoom out operation, as will be described in more detail later.

Regarding operation of the touchpad it may use any suitable method to detect touches to its surface. One approach is to use a system of capacitive sensors as shown in exploded section of FIG. 1. In that case the touchpad may comprise a surface 110 and, capacitive sensors 120 beneath the surface, which are to detect the location of a touch contact to the surface 110 and generate a signal based on the location of the touch contact and/or direction of movement of the touch contact across the surface. For example the capacitive sensors may include first and second layers of electrically conductive lines separated from each other by a thin insulating layer and arranged in a grid. If there is a voltage differential between the layers they may act as a capacitor and when a finger makes a touch contact with the surface of the touchpad it may affect the capacitance in its locality thus enabling the location of the touch contact to be determined. Another approach is to use an optical sensor in combination with a light source to detect light reflected from the touch contact. Other possible approaches include a system of piezoelectric sensors, resistive sensors, elastoresistive sensors or piezoelectric sensors etc.

Figure 9:
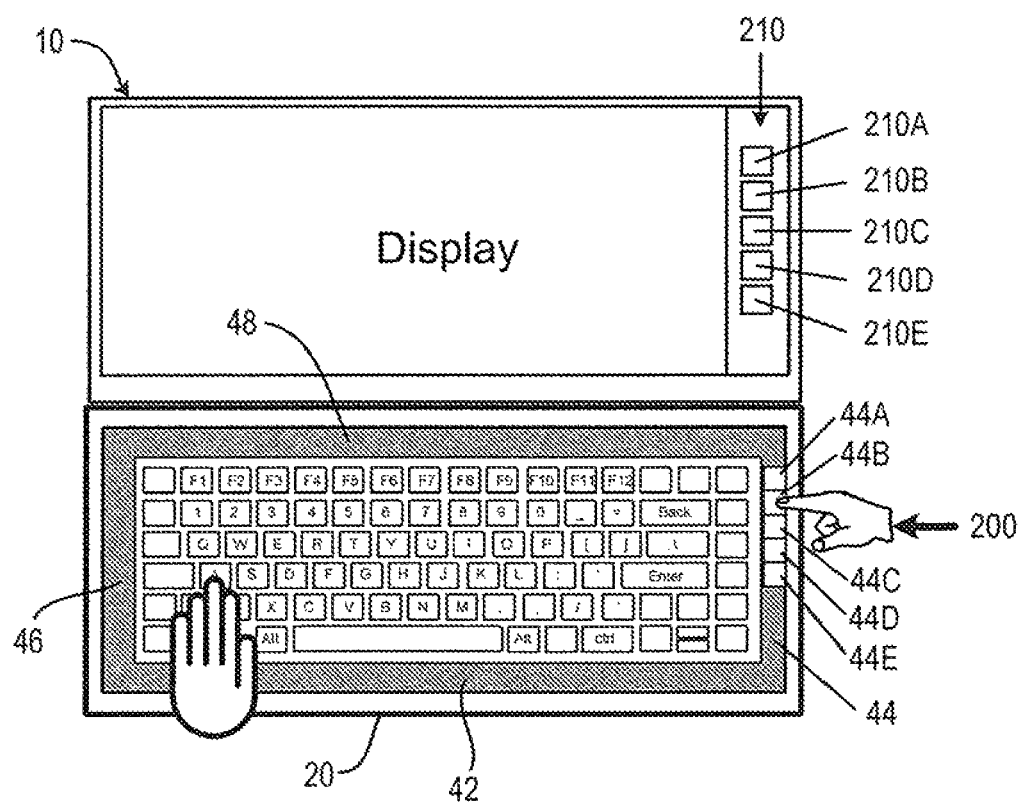
FIG. 9 is a schematic view of a menu bar operation performed by a computer device.

FIG. 9 is a schematic diagram showing an example in which a predetermined gesture on a touchpad area is used to call up a menu on the display. In response to detecting a touch gesture 200, such as a swipe, to a touchpad area which touch gesture moves in the direction towards the keyboard, the computer device may call up a menu 210 on the display. As can be seen in the example of FIG. 9 the touch gesture is to any part of the second touchpad area 44 on a right side of the keyboard and is a gesture moving inwards towards the keyboard. In response to detecting this gesture the computer device brings up a menu bar on the right side of the display. However, it would be possible in different implementations to have the same or different menus bought up by similar touch gestures to other touchpad areas. For example, if set up for left handed users the menu and associated touchpad area may be on the left of the keyboard and the left of the display. Further, once the menu has been called up an item on the menu may be selected by using the same touchpad area.

For example, the menu 210 may include a plurality of items 210A-210E and a user may select an item by tapping a corresponding area of the touchpad area. Thus a touch to the touchpad is mapped to a corresponding part of the menu shown on the display. In the illustrated example the menu 210 is in the form of a bar comprising a plurality of icons 210A-210E and is designed for use with a touch sensitive display. However, by using the touchpad area the user is able to call up the menu and select an item from the menu, even without using the touch sensitive display. This may be more convenient as the user does not need to lift their hand far from the keyboard. It also enables the menu to easily be used even on a computer device which does not have a touch sensitive display. The user may simply gesture inwards on the touchpad area and then touch a part of the touchpad area which corresponds to the desired icon on the displayed menu.

In one example the menu has fixed number of icons 210A-210E, but their content may vary depending upon the context or application in which the menu is called up. Where the display menu has a fixed number of icons, the touchpad area 44 near the keyboard may have the corresponding icon boundaries 44A-44E marked onto its surface to enable the user to easily select the desired icon.

Figure 10:
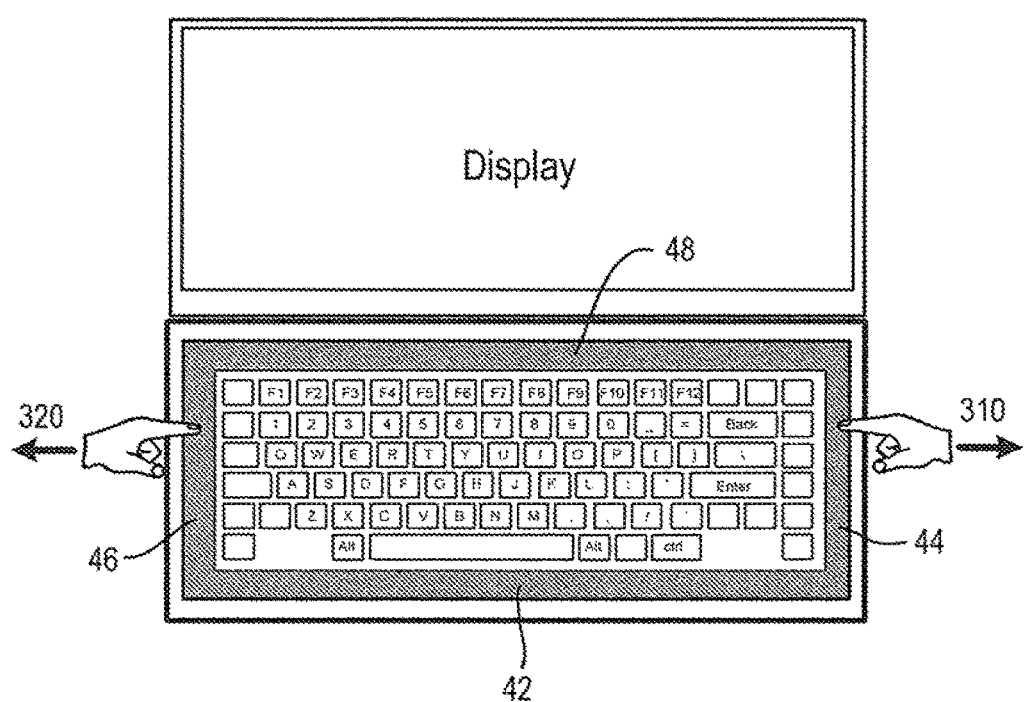
FIG. 10 is schematic view of a zoom or re-size operation performed by a computer device.

FIG. 10 is a schematic diagram showing an example in which the computer device performs a zoom in or enlargement operation to a graphical user interface, graphic or item shown on the display in response to detecting predetermined gestures on two touchpad areas. Specifically, two touchpad areas 44 and 46 are on opposite sides of the keyboard and in response to detecting a gesture 310 away from the keyboard on the touchpad area 44 at the same time as detecting a gesture 320 away from the keyboard on touchpad area 46, the computer device interprets this as a zoom in or enlargement instruction and zooms in or enlarges a graphic, item or user interface on the display. Likewise, in response to detecting a gesture towards the keyboard on the touchpad area 44 at the same time as detecting a gesture towards the keyboard on touchpad area 46, the computer device interprets this as a zoom out or size reducing instruction and zooms out or reduces the size of a graphic, item or user interface on the display. While the example in FIG. 10 has touchpad areas to the left and right of the keyboard as the touchpad areas on the opposite sides, the same technique could be implemented in response to similar touch gestures to touchpad areas at the top and bottom of the keyboard.

Figure 11:
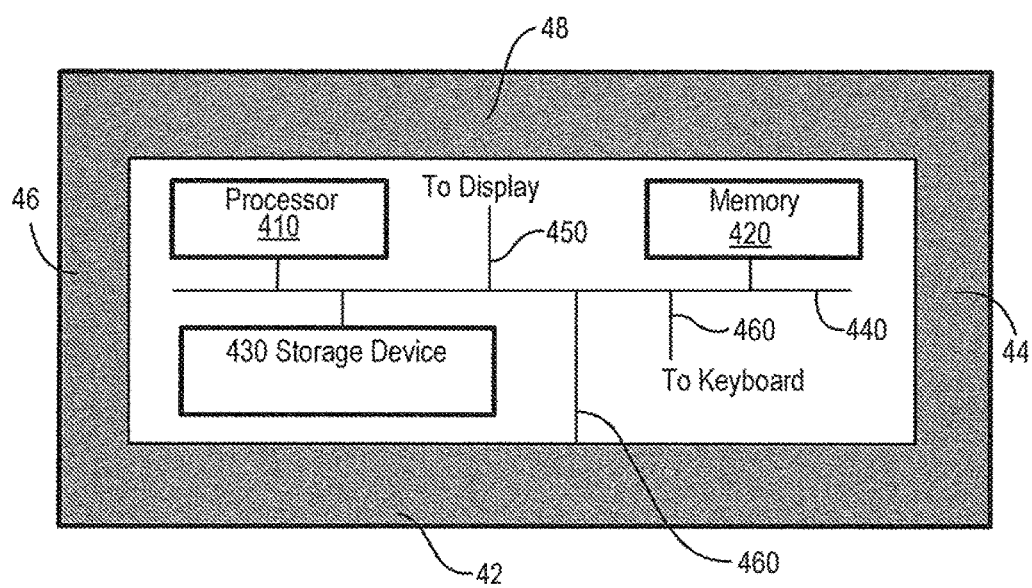
FIG. 11 is a schematic view of the internal stricture of an example computer device.

FIG. 11 is schematic diagram showing an example of an internal structure of the base of the computer device of FIG. 1. Beneath the keyboard (not shown) the base may house a processor 410, a memory 420 and a storage device such as a hard disk, CD ROM, non-volatile memory disk 430. These components may be connected by a system bus 440. The processor may control the display by sending instructions over a link 450 to the display. The processor may receive input signals from the keyboard through input line 460 connected to the keyboard (not shown). The touchpad areas 42, 44, 46 and 48 are shown in this example as a single touchpad device with a connection 470 to the system bus and processor, but in other examples the touchpad areas may be implemented by a separate touchpad devices each with their own connection to the system bus. The illustrated configuration is just one possible example and variations and other combinations of internal components and methods of linking the components may be used.

Figure 12:
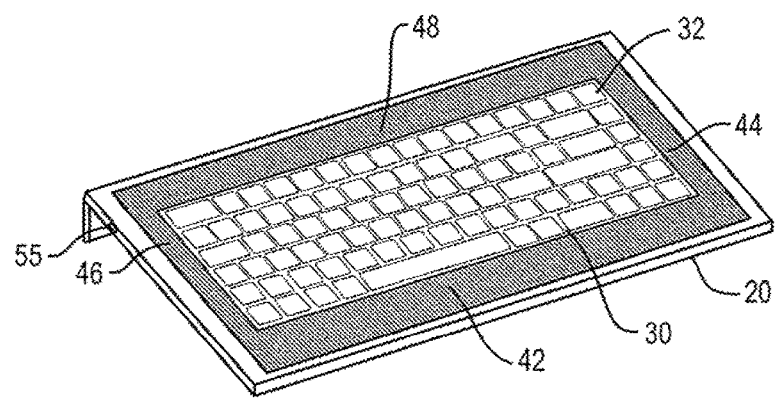
FIG. 12 is a perspective view of an external keyboard for use with a computer device.

While the above examples refer to a computer device including a display and a base, the teachings of the present disclosure and the above examples may be applied to an external keyboard. An "external keyboard" is a keyboard which is separate from the computer device with which it is to be used. An example is shown in FIG. 12. The external keyboard 20 includes a keyboard area 22, a plurality of touchpad areas 42, 44, 46, 48 located at sides of the keyboard as previously described and an output port 55 for outputting signals to a separate computer device based on key presses and touch gestures to the touchpad areas. The output port may be a USB port, serial port, PS/2 port, wireless port, Bluetooth port or infrared port etc.

While the external keyboard shown in FIG. 12 includes four touch pad areas, it is possible to have an external keyboard with just three touchpad areas or just two touchpad areas located at different sides of the keyboard as discussed above in the examples of FIGS. 3 and 4.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:
1. A computing device comprising:
a display; and a base including a keyboard, a first touchpad area located at a first side of the keyboard, and a second touchpad area located at a second side of the keyboard, wherein the first and second touchpad areas are to receive a gesture made by a user and convert the gesture to an input to the computer device, and wherein the first touchpad area includes a first predetermined section, the first predetermined section of the first touchpad area is to receive a touch from the user to turn the first touchpad area on or off independently of the second touchpad area, and wherein the second touchpad area includes a second predetermined section, the second predetermined section of the second touchpad area is to receive a touch from the user to turn the second touchpad area on or off independently of the first touchpad area.

2. The computing device of claim 1, wherein the base includes a third touchpad area at a third side of the keyboard.

3. The computing device of claim 2, wherein the base includes a fourth touchpad area at a fourth side of the keyboard.

4. The computing device of claim 1 wherein the keyboard has a first portion having a first width and a second portion having a second width which is less than the first width, and wherein the second touchpad area extends into an area adjacent both the first and second portions of the keyboard.

5. The computing device of claim 4 wherein the keyboard has a T shape or inverted T shape.

6. The computing device of claim 1, wherein one of the first and second touchpad areas extends across an entire length of one side of the keyboard.

7. The computing device of claim 1 wherein the second touchpad area is located at the right or a left side of the keyboard and wherein a touch gesture towards the keyboard is to bring up a menu on the display.

8. The computing device of claim 7 wherein the menu includes a plurality of icons and wherein the computing device is to detect a subsequent touch to the second touchpad area and map the touch to a corresponding position on the menu.

9. The computing device of claim 1 wherein the first and second touchpad areas join seamlessly together.

10. The computing device of claim 1, wherein the first and second touchpad areas are turned on and off upon receiving a double tapping touch from the user at the first and second predetermined sections, respectively.

11. The computing device of claim 1 wherein said first and second touchpad areas are on opposite sides of the keyboard and wherein a touch gesture away from the keyboard on the first touchpad area at the same time as a touch gesture away from the keyboard on the second touchpad area, is to cause a zoom in or enlargement operation to a user interface, graphic or item shown on the display.

12. A computing device comprising:
a display; and
a base connected to the display, the base including a keyboard and first and second touch pad areas located at first and second sides of the keyboard,
wherein the keyboard includes a plurality of depressible keys,
wherein the first and second touchpad areas include a touch panel and a sensor arrangement to detect a touch contact to a surface of the touch panel, said sensor arrangement including one of the following types of sensor: a capacitive sensor, a resistive sensor, a piezo-electric sensor, an elasto-resistive sensor, a piezo-resistive sensor or an optical sensor, and
wherein the first touchpad area includes a first predetermined section, the first predetermined section of the first touchpad area is to receive a touch from the user to turn the first touchpad area on or off independently of the second touchpad area, and
wherein the second touchpad area includes a second predetermined section, the second predetermined section of the second touchpad area is to receive a touch from the user to turn the second touchpad area on or off independently of the first touchpad area.

13. The computing device of claim 12, wherein the first and second touchpad areas are to sense movement of a touch contact made by a user's finger moving across a surface of the respective touchpad area and to translate the sensed movement to an input to the computer device.

14. The computing device of claim 12, wherein the touch received from the user to turn each of the first and second touchpad areas on and off is a double tapping touch.

15. An external keyboard for a computing device, comprising:
a keyboard area including a plurality of keys;
first and second touch pad areas located at first and second sides of the keyboard area, respectively, wherein the first touchpad area includes a first predetermined section, the first predetermined section of the first touchpad area is to receive a touch from the user to turn the first touchpad area on or off independently of the second touchpad area, and
wherein the second touchpad area includes a second predetermined section, the second predetermined section of the second touchpad area is to receive a touch from the user to turn the second touchpad area on or off independently of the first touchpad area;
circuitry in the external keyboard to convert key presses in the keyboard area to output signals corresponding to pressed keys and to detect a direction of movement of a touch contact moving across the first or second touchpad areas and to generate an output signal based on the detected direction of movement; and
an output port to send the output signals to a computing device which is separate from the external keyboard.

16. The external keyboard of claim 15 wherein the output port is a USB port, serial port, PS/2 port, wireless port, Bluetooth port or infrared port.

17. The external keyboard of claim 15, wherein the touch received from the user to turn each of the first and second touchpad areas on and off is a double tapping touch.

* * * * *

UNITED STATES PATENT AND TRADEMARK OFFICE
CERTIFICATE OF CORRECTION

PATENT NO. : 10,114,485 B2
APPLICATION NO. : 14/911276
DATED : October 30, 2018
INVENTOR(S) : Gen-Hung Su Page 1 of 1

It is certified that error appears in the above-identified patent and that said Letters Patent is hereby corrected as shown below:

On the Title Page

In Column 2, in item (74), Attorney, Agent or Firm, Line 1, delete "Patnet" and insert -- Patent --, therefor.

Signed and Sealed this
Nineteenth Day of February, 2019

Andrei Iancu
*Director of the United States Patent and Trademark Office*